Patented Aug. 19, 1947

2,426,122

UNITED STATES PATENT OFFICE 2,426,122

PRODUCTION OF ORGANO-SILICON COMPOUNDS

John B. Rust, Montclair, and Charles A. MacKenzie, Upper Montclair, N. J., assignors to Montclair Research Corporation, a corporation of New Jersey No Drawing. Application October 17, 1944, Serial No. 559,128

8 Claims. (Cl. 260—607)

This invention relates to organic silicon derivatives, particularly halides and hydrolytic products thereof, which derivatives contain hydrocarbon groups, particularly alkyl and aryl groups including aliphatic, carbocyclic and alicyclic groups, to methods of making such products and to compositions containing them.

Heretofore alkyl and aryl silicon halide derivatives have been made, generally, by the action of alkyl or aryl magnesium halides on silicon halides. It has also been reported that certain other metal alkyls or aryls such as zinc and mercury alkyls and aryls could be employed. When using the alkyl or aryl magnesium halides, relatively large amounts of ethyl ether were employed and strong cooling was necessary, and the process had to be carried out in at least two steps, namely: (1) preparation of the Grignard reagent; and (2) reaction of the silicon halide with the Grignard reagent.

A process of making substituted silicon halides without the use of an intermediate Grignard reagent has been described. (Reference: J. C. S. 95, 302–114; J. C. S. 93, 2004–2016; J. C. S. 97, 142–147.) However, an inspection of this work shows that in only the case of benzyl derivatives was the yield appreciable and then only because the normal Grignard reaction gave still poorer yields. Inspection of reference J. C. S. 95, 311–313 shows that when applied to the ethyl derivatives unacceptably poor results were obtained. In the case of reference J. C. S. 97, 145–146, it will be seen that here again a dibenzyl ethyl silicon chloride is formed without the use of a Grignard reagent but that it was necessary to react this with a Grignard reagent (namely, propyl magnesium bromide) to obtain the dibenzyl ethyl propyl silicon. It should be noted especially, that the authors of the references cited above, thought it necessary to employ strong cooling during their reaction. Furthermore, especially in reference J. C. S. 95, 311–313, it will be seen that a mixture of all possible derivatives was obtained. These observations in connection with the citations referred to above will be found to be in contradistinction to the results of the processes of the present invention.

In copending application Serial No. 509,017, filed November 3, 1943, entitled Organo-silicon derivatives and process of making same, of which the present application is a continuation-in-part, there is described a one-step process of making silicon derivatives which differs from the prior art processes described in the above cited references, in that excellent control of the reaction was secured with subsequent excellent yields by adding a mixture of alkyl or aryl halide and silicon tetrahalide to magnesium. In this way a low concentration of both reactants was maintained in the presence of a relatively large amount of magnesium throughout the main portion of the reaction. Furthermore, the reaction was carried out at an elevated temperature which was sufficient in the case where ether was used as a solvent, to maintain it at a vigorous boil. No cooling was employed. Due to the conditions used in the process of the above described application, very excellent yields of the desired reaction product were secured with little or no side reactions and with any desired alkyl or aryl halide. In other words, the production of substituted silicon halides which had been found not practical by the processes in the above cited references, became practical and economical by the changed conditions in the process described in the above noted copending application.

It has now been found that by making several other important changes, a process of producing substituted silicon derivatives in high yield with practically any alkyl or aryl halide is obtained. The process of the present invention consists essentially of mixing together a silicon halide with a solvent and magnesium and then adding an alkyl halide slowly to the mixture and carrying out the reaction at an elevated temperature in the shortest possible time which is compatible with good control of the reaction.

Among the objects of the present invention, therefore, is the production of carbon silicon bonded materials produced by economic and simple methods.

Other objects include the production of silicon derivatives such as substituted silicon halides and hydrolytic and conversion products thereof, such as plastics, lacquers and resins in good yield and by relatively controllable inexpensive processes.

Further objects include the production of substituted silicon halides in one step without the use of intermediate Grignard reagents and in high yield and a high state of purity.

Still further objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

In accordance with the present invention, a halo hydrocarbon, particularly a chloride, bromide or iodide of an aliphatic, aromatic or cyclic non-aromatic hydrocarbon, is reacted with a mixture of a silicon halide and magnesium at an elevated temperature under controlled conditions to give the desired reaction product. The process is essentially a one step reaction for the production of the organo silicon halide or related derivative which obviates the use of the troublesome and difficultly workable organo magnesium halides. Thus a halo hydrocarbon such as an alkyl or aryl halide is added to a mixture of the silicon halide and magnesium metal at an elevated temperature in a one stage reaction.

As will be pointed out below, a solvent may be employed. The degree of substitution of the silicon halide is easily controllable by varying the proportion of either the magnesium metal or the organic halide or both. It is thus possible to produce in good yields for instance, a mono-alkyl silicon tri-halide, a di-alkyl silicon di-halide, a tri-alkyl silicon mono-halide, or a tetra alkyl silicon. The excellent control of the process of the present invention and the production of substantially pure substituted silicon halides is surprising since in some cases it would be predictable on theoretical grounds that mixtures of all possible substituted silicon halides would result.

The reaction may be carried out either in the presence of or in the absence of a solvent, or if desired, a solvent may be added at the end of the reaction to dilute the reaction mixture. If a solvent is employed, it may be an ether, a hydrocarbon such as an aromatic, aliphatic or alicyclic hydrocarbon and the like, such solvents desirably being liquids at ordinary temperatures or liquid at the temperature at which the reaction is carried out. It has been found that in general, the concurrent reaction of an organic halide with silicon tetrachloride or other silicon halide is accelerated by the presence of some solvent in which a Grignard reagent is easily formed, such as ethyl ether, butyl ether, ethyl orthosilicate and the like, or the Grignard reagent itself. Such solvent is called herein a Grignard solvent. Catalysts formerly employed for accelerating Grignard reactions may be present.

The temperature employed during the reaction is one at which refluxing takes place, such temperature being in part dependent on the nature of the reacting materials themselves, and the conditions such as whether or not superatmospheric pressure is maintained during the course of the reaction. The refluxing may be due to one of the organic reactants or to the solvent and when diethyl ether is employed as the Grignard solvent, the temperature is usually one at which the ether refluxes. Thus for ethyl ether the temperature would be approximately 35° C. to obtain refluxing. However, if desired to obtain a higher temperature, the reaction may be carried out under pressure and the temperature of reaction thus may be elevated to about 40° or 50° C. When no solvent is employed or high boiling materials such as toluene, butyl ether, etc. are present, the temperature sometimes rises as high as 150° C. or higher. When the lower temperatures, such as 35° C. are used with ethyl ether, it has been found desirable to maintain a rapid to moderate reflux in order to carry out the one-step reaction of the present invention so as to obtain the best possible yields. However, if the temperature is allowed to drop substantially, poor yields result. Thus the condition set forth that a temperature of about 30-35° C. be utilized is about the lowest permissible consonant with the desired yields. As regards the upper limit of temperature, this is rather flexible depending on operating conditions and temperatures as high as 200° C. may be utilized.

Thus in accordance with the present invention it is an object to produce in relatively pure form, the simple substituted silicon halides. These halides, which may be in many cases readily distillable, may then serve as intermediates in the production of a number of industrially usable products. For instance, they may be reacted with alcohols, glycols, amines, acid salts and the like, or they may be hydrolyzed in water and converted into tough plastic materials by the application of heat or catalysts. Other uses will appear hereinafter.

The following examples are given to illustrate the processes of the present invention and the products obtainable therefrom.

In the first example, methyl silicon trichloride is made by adding methyl bromide to an ethereal mixture of magnesium turnings and silicon tetrachloride.

*Example 1*

In a three-necked, three liter flask, equipped with a stopcock and a glass wool filter at the base, were placed 172.0 ml. silicon tetrachloride (1.5 moles), 36.5 g. magnesium turnings (1.5 moles), and 1500 ml. diethyl ether. An efficient reflux condenser and a stirrer were connected to the flask. The contents of the flask were warmed gently and the methyl bromide, in a gaseous form, was introduced slowly until the reaction started (as evidenced by refluxing of the ether). The stirrer was started and the methyl bromide was introduced at such a rate that only moderate refluxing of the ether occurred at the elevated temperature employed. The reaction was considered complete when all the magnesium had disappeared. The contents of the flask was stirred for one hour, after which the product was filtered through the glass wool at the base of the flask. The magnesium salt that had formed in the reaction was washed repeatedly with ether and the washings were filtered through the base of the flask and added to the original filtration product. The ether was removed from the product by distillation through an efficient fractionating column. The fraction boiling 60–68° C. was collected and refractionated. The portion of the distillate boiling 66–68° C. was collected as methyl silicon trichloride.

In the next example dimethyl silicon dichloride is made by adding methyl bromide to an ethereal mixture of magnesium turnings and silicon tetrachloride.

*Example 2*

The flask described in Example 1 was used in this experiment. In the flask were placed 172.0 ml. of silicon tetrachloride (1.5 moles), 73.0 g. magnesium turnings (3.0 moles) and 1800 ml. of diethyl ether. The reaction was started by warming the solution and passing in a slow stream of methyl bromide gas. After the reaction started the stirrer was started and the methyl bromide was passed into the mixture at a moderate rate so that an elevated temperature was maintained evidenced by continuous refluxing. The reaction was considered complete when all the magnesium had disappeared. The mixture was then stirred for one hour, after which the product was drawn off through the stop-cock at the bottom of the flask. The magnesium salt in the flask was repeatedly washed with either and the washings were added to the original filtrate. The ether was then removed from the product by distillation through an efficient fractionating column. Repeated fractionation of the residue gave a product boiling 68–70° C., corresponding to the boiling range of dimethyl silicon dichloride.

The preparation of ethyl silicon trichloride is illustrated in the next example. Ethyl bromide is added to an ethereal mixture of magnesium and silicon tetrachloride.

Example 3

In a 1-liter, round-bottom, 3-neck flask was placed a mixture of 57.3 ml. silicon tetrachloride (0.5 mole), 12.2 g. magnesium turnings (0.5 mole) and 500 ml. of diethyl ether. The mixture was warmed to refluxing and about 5 ml. of ethyl bromide was added. After the reaction had begun the stirrer was started and the ethyl bromide was added at an elevated temperature and at such a rate that moderate refluxing occurred. When the reaction was complete, as evidenced by the disappearance of the magnesium, the ethyl bromide was shut off and the contents of the flask were stirred for one hour. The magnesium salt was allowed to settle and then the ether solution was decanted under anhydrous conditions. The salt was washed four times with 100 ml. portions of ether. The washings were added to the original decanted solution. The mixture was fractionally distilled. Forty grams of ethyl silicon trichloride boiling 98–100° C., was obtained, representing a 49% yield.

The preparation of diethyl silicon dichloride is described in the next example. The procedure used differs from those described in preceding examples in that both a decantation and a distillation of the product from the magnesium salt are used in the purification process.

Example 4

In a 3-liter, 3-neck flask, equipped with a stirrer and a reflux condenser, were placed 114.7 ml. silicon tetrachloride (1.0 mole), 48.7 g. magnesium turnings (2.0 moles) and 1200 ml. diethyl ether. Several milliliters of ethyl bromide were added and the contents of the flask were heated until the ether refluxed. The reaction started after a few minutes of heating and was maintained at an elevated temperature throughout. The remainder of the ethyl bromide was then added dropwise. After all the ethyl bromide had been added the mixture was stirred for 1 hour. The solid was allowed to settle after which the liquid was decanted from it. The flask was then connected to a condenser. The remainder of the product was removed by distillation from the solid. An oil bath was used to heat the flask. The temperature of the oil was slowly raised to 325° C. After five hours the distillation had practically ceased so the heating was discontinued. The ether was removed from the product by distillation through a ten bulb pear column. After the removal of the ether the temperature of the oil bath was raised and there was obtained 120.8 g. of material, boiling 110–130° C. Further fractionation gave 105.8 g. of product boiling 129–131° C. The yield of pure diethyl silicon dichloride was 67.5% of theory.

In the next example triethyl silicon chloride is prepared by adding ethyl bromide to an ethereal mixture of magnesium and silicon tetrachloride.

Example 5

In a 5-liter, 3-neck, round-bottom flask, equipped with a stirrer and reflux condenser, were placed 114.7 ml. (1 mole) silicon tetrachloride, 73.0 g. (3 moles) magnesium turnings and 1500 ml. diethyl ether. The flask was warmed gently and 10 ml. of ethyl bromide was added. After the reaction started, ethyl bromide was added at an elevated temperature and at such a rate that moderate refluxing occurred. Ethyl bromide was added until all of the magnesium had disappeared. After the ethyl bromide was shut off stirring was continued for one hour, after which period the condenser was changed to a distilling position and the mixture was distilled with the aid of an oil bath. Over a three hour period the temperature of the oil bath was gradually raised to 360° C. The mixture thus obtained was subjected to fractional distillation through an efficient fractionating column. The fraction boiling at 143–146° C. was collected as triethyl silicon chloride.

The next example describes the preparation of n-butyl silicon trichloride by the addition of n-butyl bromide to an ethereal mixture of magnesium and silicon tetrachloride.

Example 6

In a 3-liter, 3-neck, round-bottom flask, equipped with a stirrer and a reflux condenser, were placed 24.3 g. (1 mole) of magnesium turnings, 114.7 ml. (1 mole) of silicon tetrachloride, and 800 ml. of diethyl ether. About 5 ml. of n-butyl bromide was added and the mixture was warmed. When the reaction had started, the stirrer was turned on and butyl-bromide was introduced at an elevated temperature and at such a rate that moderate refluxing occurred. The reaction was considered complete when all of the magnesium had disappeared. Stirring was continued, at room temperature, for one hour longer. The condenser was then set for distillation and an oil bath was placed around the flask. The temperature of the oil was gradually raised, over a three hour period, to 325° C. The distillate obtained was fractionally distilled. There was obtained a 50% yield of n-butyl silicon trichloride boiling 147–149° C.

In the next example tetraethyl silane is prepared by the addition of ethyl bromide to an ethereal mixture of magnesium and silicon tetrachloride.

Example 7

In a 3-liter, 3-neck, round-bottom flask, equipped with a stirrer and reflux condenser, were placed one liter of ether, 57.3 ml. (0.5 mole) silicon tetrachloride, and 48.7 g. (2.0 moles) of magnesium turnings. About 5 ml. of ethyl bromide was added and the flask was warmed. After the reaction started the ethyl bromide was added at an elevated temperature and at such a rate that the ether refluxed moderately. After the magnesium had disappeared the addition of ethyl bromide was discontinued. Stirring was continued for one hour. The condenser was changed to a distillation position and the volatile material was slowly distilled from the salt. The mixture thus obtained was fractionally distilled and tetraethyl silane, boiling 152–154° C. was collected.

In the next example, a methyl silicon polymer is prepared by hydrolysis followed by heating, of a mixture of methyl silicon chlorides. The methyl silicon chlorides in turn are prepared by the addition of methyl bromide to an ethereal mixture of magnesium and silicon tetrachloride.

Example 8

| | | |
|---|---|---|
| Silicon tetrachloride (0.125 mole) | ml | 14.2 |
| Magnesium turnings (0.125 mole) | g | 3.0 |
| Methyl bromide (0.125 mole) | g | 11.9 |
| Diethyl ether | ml | 100.0 |

The silicon tetrachloride, magnesium turnings and ether were placed together in a 500 ml. round-bottom, 3-neck flask, equipped with a reflux condenser and a stirrer. The flask was heated until the ether slowly refluxed. Gaseous methyl bromide was then introduced into the mixture at an elevated temperature and maintained at an elevated temperature throughout the reaction. A reaction soon started that was kept under control by the rate of addition of the methyl bromide. The methyl bromide was shut off after the disappearance of the magnesium. The contents of the flask were stirred at room temperature for an hour, after which they were poured into a beaker filled with cracked ice. The ether layer was removed and dried with sodium sulfate. The ether was removed from the product by means of a water pump. The residue weighed 8.0 g. representing a yield of 68%, based on the formula $CH_3Si(OH)_3$. Heat converted the product into a hard, brittle, polymeric mass.

In all subsequent preparations of silicon polymers the general procedure described in Example 8 is used.

In this example an ethyl silicon polymer is prepared.

Example 9

| | | |
|---|---|---|
| Silicon tetrachloride (0.125 mole) | ml | 14.2 |
| Magnesium turnings (0.125 mole) | g | 3.0 |
| Ethyl bromide (0.125 mole) | g | 9.5 |
| Diethyl ether | ml | 150.0 |

All materials except the ethyl bromide were placed in a 500 ml., 3-neck, round-bottom flask equipped with a stirrer and a reflux condenser. Two ml. of the ethyl bromide were added and the flask heated until the reaction started. The heat was removed and the rest of the ethyl bromide was added at an elevated temperature and at such a rate that the ether refluxed moderately. After all of the ethyl bromide had been added the mixture was stirred, at room temperature, for one hour. It was then poured onto cracked ice and the ether layer was subsequently separated and dried. After the ether had been drawn off at the water pump, the residue was found to weigh 8.6 g., representing a 64% yield based on the formula $C_2H_5Si(OH)_3$. When heated at about 100° C. the product turned into a hard, polymeric substance.

The preparation of a propyl silicon polymer is described in the next example.

Example 10

| | | |
|---|---|---|
| Silicon tetrachloride (0.125 mole) | ml | 14.2 |
| Magnesium turnings (0.125 mole) | g | 3.0 |
| n-Propyl bromide (0.125 mole) | ml | 11.4 |
| Diethyl ether | ml | 150.0 |

The silicon tetrachloride, magnesium turnings and ether were placed in a 500 ml., 3-neck, round-bottom flask equipped with a stirrer and reflux condenser. Three ml. of propyl bromide were added and the flask was warmed until the reaction started. After the reaction started the propyl bromide was added slowly at an elevated temperature. When all of the propyl bromide had been added, stirring of the mixture was continued for one hour. The contents of the flask were then poured on cracked ice. The ether layer was separated and dried over sodium sulfate. The ether was removed from the product with the aid of a water pump. The residue weighed 10.7 g. representing at 70% yield based on the formula $C_3H_7Si(OH)_3$. When the sample was heated at 100–110° C. for several hours it turned to a hard, polymeric mass.

The next example illustrates the preparation of a butyl silicon polymer.

Example 11

| | | |
|---|---|---|
| Silicon tetrachloride (0.125 mole) | ml | 14.2 |
| Magnesium turnings (0.125 mole) | g | 3.0 |
| n-Butyl bromide (0.125 mole) | ml | 16.1 |
| Diethyl ether | ml | 150.0 |

In a 500 ml., 3-neck, round-bottom flask, equipped with a stirrer and a reflux condenser, were placed the above indicated quantities of silicon tetrachloride, magnesium turnings, and ethyl ether. Four mls. of butyl bromide were added and the contents of the flask were warmed until the reaction started. The rest of the butyl bromide was run in, with stirring, at an elevated temperature and at such a rate that the ether refluxed moderately. After all the butyl bromide had been added the mixture was stirred at room temperature for one hour. It was then poured on cracked ice and the ether layer was separated and dried. The ether was removed under reduced pressure and a water pump. The residue remaining after the removal of the ether weighed 10.3 g., representing a 61% yield based on the formula $C_4H_9Si(OH)_3$. When the product was heated at 120° C. for four hours it changed to a hard, polymeric mass.

In Example 12 the preparation of a hexyl silicon polymer is described.

Example 12

| | | |
|---|---|---|
| Silicon tetrachloride (0.20 mole) | ml | 22.5 |
| Magnesium turnings (0.20 mole) | g | 4.9 |
| n-Hexyl bromide (0.20 mole) | ml | 30.0 |
| Diethyl ether | ml | 150.0 |

The silicon tetrachloride, magnesium turnings and ether are placed in a 500 ml., 3-neck, round-bottom flask, equipped with a stirrer and reflux condenser. Four ml. of n-hexyl bromide were added, and the flask was heated until the reaction started. The stirrer was started and the rest of the hexyl bromide was added slowly from a dropping funnel at an elevated temperature. After all the hexyl bromide had been added and the ether had stopped refluxing, stirring was continued for one hour at room temperature. The mixture was then poured on cracked ice, the ether layer was separated and dried, and the ether was removed from the product under vacuum with a water pump. The residue weighed 21.3 g. representing a 65% yield based on the formula $$C_6H_{13}Si(OH)_3$$

When the product was heated for seven days at 140° C. it become somewhat viscous but did not solidify.

In the next example a phenyl silicon polymer preparation is described.

Example 13

| | | |
|---|---|---|
| Silicon tetrachloride (0.125 mole) | ml | 14.2 |
| Magnesium turnings (0.125 mole) | g | 3.0 |
| Bromobenzene (0.125 mole) | ml | 13.1 |
| Diethyl ether | ml | 150.0 |

All of the above ingredients were placed in a 500 ml., 3-neck, round-bottom flask, equipped with a stirrer and a reflux condenser. The mixture was warmed until the reaction started. The stirrer was started and the reaction continued at a moderate rate at an elevated temperature. The reaction was considered complete when the ether stopped refluxing. Stirring was continued for another hour. The mixture was then poured on cracked ice, the ether layer separated and dried, and the ether finally removed under vacuum at the water pump. The residue remaining weighed 10.2 g., representing a 52% yield based on the formula $C_6H_5Si(OH)_3$. When some of the product was poured on a glass plate and heated, a hard, clear film of polymeric material was obtained.

Thus the process of the present invention consists essentially of a one-step reaction which obviates the use of a troublesome and difficultly workable alkyl or aryl magnesium halide. Furthermore, surprisingly the alkyl silicon halides may be produced in excellent yield by this invention. Thus it is known that when an alkyl halide is reacted alone with magnesium to produce a Grignard reagent, substantially less than the theoretical yield is to be expected. Therefore, in the old two-step process, the yield was less than theoretical in both steps, giving a much reduced small yield. It has been found that in the herein described one-step procedure a very satisfactory yield of the desired reactant is secured in spite of the fact that on theoretical grounds it might be predicted that a difficultly separable mixture of all possible reaction products would result. Thus the results of this process are all the more surprising since the weight of theoretical knowledge is against the success of such a process.

In the case where a solvent is used in the process of the present invention and especially an ether solvent such as ethyl ether, the reaction proceeds rapidly. In some cases a violent reaction occurs. It has been found that excellent control may be achieved by the addition of the organic halide to the mixture of silicon halide and magnesium metal slowly but at the same time maintaining an elevated temperature. In some other cases, the reaction does not proceed exothermically but must be forced by the application of heat. In these cases, especially where a low boiling volatile halide is employed, it is necessary to carry out the reaction under pressure.

As well as the alkyl and aryl silicon halides described above, mixed halides may also be prepared such as methyl butyl silicon dihalide, ethyl propyl silicon dihalide, diethyl butyl silicon halide and the like, by the one step process of the present invention.

The substituted silicon halides and tetra substituted silicons prepared according to the above descriptions may be preserved for future use by placing them in solvents or they may be sealed in containers. The halide materials tend to fume in the air and corrode corrodible materials with which they are in contact. With fuming in moist air, hydrogen halides are formed and substituted silicon oxides are precipitated. Thus for storage and shipment it is best to have the containers moistureproof or of non-corrosive material and sealed from contact with the air. The silicon halide derivatives and tetrasubstituted silicons of the present invention are soluble in a large variety of solvents such as hexane, benzene, toluene and so forth; ethers such as dimethyl, diethyl, diisopropyl, dibutyl, or mixed ethers, esters such as ethyl, butyl or amyl acetates and so forth. It is also possible to react the substituted halides of the present invention with alcohols in order to form the alkoxy silicon derivatives or the acyl substituted silicons may be prepared according to the process of the above described copending application.

As the hydrocarbon substituents attached to the silicon in the substituted silicon halides and tetra substituted silicons of the present invention, there may be used alkyl, aryl, olefinyl, alkenyl, alkynyl, arenyl and arynyl, alicyclic, cycloaromatic, aralkyl derivatives, as illustrated by methyl, ethyl, propyl, butyl, amyl, hexyl, heptyl, octyl, vinyl, allyl, butenyl, the radicals from acetylene, methyl, acetylene, propyl acetylene, cyclohexyl, benzyl, phenyl, tolyl, xenyl, chlorphenyl, styryl and radicals from such derivatives as phenylacetylene.

The silicon halide is desirably the tetra halide such as silicon tetrachloride, silicon tetrabromide and silicon tetraiodide, but other derivatives can be used such as silicon tetrafluoride, disilicon hexahalides, trisilicon octahalides and polysilicon polyhaldies, silicon oxychlorides, and the like.

The materials made by the process of the present invention may be used for a large number of applications. For instance, as pointed out above, the substituted silicon halides may be reacted with hydroxy compounds or they may be hydrolyzed and used in a solvent, and the like.

The hydrolyzed or partially hydrolyzed or etherified alkoxy or acyl or unchanged materials of the present invention may be used as lacquers or adhesives either alone or in mixture with other completely reacted or potentially reactive compounds. Such compounds may include resins such as rosin, copal, shellac and so forth, as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives, including the esters of acrylic and methacrylic acids and so forth.

The silicon derivatives of the present invention, as illustrated above, may be used as textile finishing compositions to render the textiles hydrophobic. This process may also be applied to ceramics or metals, especially those materials which naturally possess a thin oxide coating. Conversion products of the present invention may also be used on textiles to produce waterproofing, creaseproofing, wrinkleproofing, and the like, and to render rayons slip-proof.

The silicon derivatives of the present invention may be used alone (i. e., tetra substituted silicon), or the hydrolytic products may be used as lubricating oils, or may be used as additives to hydrocarbon oils such as lubricating oils and also for inclusion with vegetable oils, particularly the drying oils such as linseed oil and China-wood oil, and the semi-drying oils such as soya bean oil and so forth, as well as the non-drying oils including castor oil and so forth. Thus the substituted silicon derivatives made from the intermediates of the present invention may be blended or cooked with the vegetable oils. The hydrolytic products of the present invention may be used as heat transfer liquids since they possess in general excellent heat stability. In view of their excellent electrical properties some of the conversion products of the intermediates made according to the process of the present invention may be used either per se or as varnishes and so forth in producing coatings or coated articles for electrical insulation and as a dielectrical liquid and so forth. These silicon derivatives may also be used in the production of laminated products for bonding together two or more sheets of the same or different organic or inorganic materials. The silicon derivatives are utilizable as plasticizers as well as binders and their utilization for such purposes may be controlled by the number of alkyl or aryl or similar substituents introduced into the derivative.

Having thus set forth our invention, we claim:

1. The method of preparing an organo silicon derivative which comprises adding a halo hydrocarbon to a heated mixture of silicon halide, magnesium and Grignard solvent of an alkyl ether having not more than four carbon atoms at a temperature within the range 30–200° C. at which refluxing of the ether takes place to produce a reaction product containing an organo silicon halide in substantial amount, the organo group being the hydrocarbon group of the halo hydrocarbon.

2. The process of claim 1, in which the solvent is diethyl ether and the temperature is that at which the diethyl ether refluxes.

3. The method of preparing an organo silicon derivative which comprises adding an alkyl halide to a heated mixture of silicon halide and magnesium in the presence of a Grignard solvent of an alkyl ether having not more than four carbon atoms at a temperature within the range 30–200° C. at which refluxing of the ether takes place to produce a reaction product containing an alkyl silicon halide in substantial amount, the alkyl group being that of the alkyl halide.

4. The method of preparing an organo silicon derivative which comprises adding an aryl halide to a heated mixture of silicon halide with magnesium in the presence of a Grignard solvent at a temperature within the range 30–200° C. at which refluxing takes place to produce a reaction product containing an aryl silicon halide in substantial amount, the aryl group being that of the aryl halide.

5. The method of preparing an organo silicon halide having a single substituent organic group which comprises adding a halo hydrocarbon to a heated mixture of silicon halide, magnesium and Grignard solvent at a temperature within the range 30–200° C. at which refluxing takes place, the mole ratios of the reactants being 1:1:1 to produce a reaction product containing an organo silicon halide in substantial amount, the organo group being the hydrocarbon group of the halo hydrocarbon.

6. The method of preparing an organo silicon halide having two substituent organic groups which comprises adding a halo hydrocarbon to a heated mixture of silicon halide, magnesium and Grignard solvent at a temperature within the range 30–200° C. at which refluxing takes place, the mole ratios of the reactants being 2:1:2 to produce a reaction product containing an organo silicon halide in substantial amount containing two substituent hydrocarbon groups, the hydrocarbon groups being that of the halo hydrocarbon.

7. The method of preparing an organo silicon halide having three substituent organic groups which comprises adding a halo hydrocarbon to a heated mixture of silicon halide, magnesium and Grignard solvent at a temperature within the range 30–200° C. at which refluxing takes place, the mole ratios of the reactants being 3:1:3 to produce a reaction product containing an organo silicon halide in substantial amount containing three substituent organo groups, the organo groups being that of the halo hydrocarbon.

8. The method as set forth in claim 6 for preparing dimethyl silicon dichloride in which the halo hydrocarbon is methyl bromide and the silicon halide is silicon tetrachloride.

JOHN B. RUST.
CHARLES A. MacKENZIE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,219 | Rochow | Oct. 7, 1941 |
| 2,258,220 | Rochow | Oct. 7, 1941 |
| 2,258,221 | Rochow | Oct. 7, 1941 |
| 2,258,222 | Rochow | Oct. 7, 1941 |

OTHER REFERENCES

Martin and Kipping, Jour. Chem. Soc. (London), vol. 95, pp. 302–314 (1909).

Luff and Kipping, Jour. Chem. Soc., London, vol. 93, pp. 2004–2016 (1908).

Challenger & Kipping, Jour. Chem. Soc., London, vol. 97, pp. 142–417 (1910).

Andrianov, Chemical Abstracts, vol. 32, pp. 7892–7893 (1938).

Post, Jour. Org. Chem., vol. 5, pp. 575–576 (1940).

Beilstein, Handbuch der Org. Chem., 4th ed., vol. IV, pp. 627–630.

Beilstein, Handbuch der Org. Chem., 4th ed., vol. XVI, pp. 904–906, 898 to 912.